(12) United States Patent
Fujimura et al.

(10) Patent No.: US 6,778,756 B1
(45) Date of Patent: Aug. 17, 2004

(54) COUNTDOWN AUDIO GENERATION APPARATUS AND COUNTDOWN AUDIO GENERATION SYSTEM

(75) Inventors: Kazuya Fujimura, Ikoma (JP); Tetsuyuki Nakayasu, Moriguchi (JP); Toshihisa Abe, Izumisano (JP); Souichirou Fujioka, Sakai (JP)

(73) Assignee: Matsushita Electric Industrial Co., Ltd. (JP)

( * ) Notice: Subject to any disclaimer, the term of this patent is extended or adjusted under 35 U.S.C. 154(b) by 888 days.

(21) Appl. No.: 09/598,751

(22) Filed: Jun. 22, 2000

(30) Foreign Application Priority Data

Jun. 22, 1999 (JP) .......................................... 11-174985

(51) Int. Cl.⁷ ................................................ H04N 5/76
(52) U.S. Cl. ...................... 386/52; 386/65; 434/307 R; 360/13; 369/83
(58) Field of Search ........................... 386/1, 4, 52, 55, 386/60, 62, 64, 65; 704/278; 434/307 A, 307 R, 308, 309, 311–312, 318, 319; 360/13, 15, 31; 369/1, 83, 84; H04N 5/16, 5/91, 5/781, 5/92, 9/79

(56) References Cited

U.S. PATENT DOCUMENTS

| | | | | |
|---|---|---|---|---|
| 4,242,936 A | * | 1/1981 | Swain | 84/635 |
| 4,370,549 A | * | 1/1983 | Tomizawa | 377/2 |
| 4,396,904 A | * | 8/1983 | Hanaoka | 340/309.16 |
| 4,819,087 A | * | 4/1989 | Takeuchi et al. | 386/54 |
| 5,107,381 A | * | 4/1992 | Mitsuhashi et al. | 360/70 |
| 5,426,510 A | * | 6/1995 | Meredith | 386/107 |
| 5,510,901 A | * | 4/1996 | Takahashi et al. | 386/96 |
| 5,694,332 A | * | 12/1997 | Maturi | 700/94 |
| 5,810,600 A | * | 9/1998 | Okada | 434/185 |
| 6,442,208 B1 | * | 8/2002 | Horiguchi et al. | 375/257 |
| 6,490,728 B1 | * | 12/2002 | Kitazato et al. | 725/151 |
| 2003/0071724 A1 | * | 4/2003 | D'Amico | 340/506 |

FOREIGN PATENT DOCUMENTS

JP 10-222967 A 8/1998

* cited by examiner

Primary Examiner—Thai Tran
(74) Attorney, Agent, or Firm—Parkhurst & Wendel, L.L.P.

(57) ABSTRACT

A countdown audio generation apparatus comprises a reproduction unit for reproducing a video signal and time information between which predetermined synchronization is maintained; a video output unit for outputting the video signal reproduced by the reproduction unit; a countdown audio generation unit for generating a countdown audio signal which informs that the time information reproduced by the reproduction unit reaches a predetermined countdown end time; and an audio output unit for outputting the countdown audio signal generated by the countdown audio generation unit. Therefore, the user of this apparatus can know the predetermined countdown end time by the countdown audio.

20 Claims, 7 Drawing Sheets

COUNTDOWN AUDIO GENERATION APPARATUS AND COUNTDOWN AUDIO GENERATION SYSTEM

FIELD OF THE INVENTION

The present invention relates to a countdown audio generation apparatus for generating countdown audio and, more particularly, to that capable of informing the user of a predetermined time by using countdown audio.

BACKGROUND OF THE INVENTION

Up to date, a VTR (Video Tape Recorder) having a function of inserting narration audio into a section of an AV (Audio Visual) material which has already been recorded on a magnetic tape, has been employed;

The narrator plays back the already-recorded AV material by using this VTR, and records the narration in a desired section of the AV material. In this case, as means for informing the narrator of the timing to start narrating, a time code is superimposed on the played video when the AV material is played back. That is, the narrator memorizes the time code at the narration recording start point, and takes the timing to start narrating while watching the played video on which the time code is superimposed. In this method, however, the narrator must memorize the time code at the start point, namely, "hours, minutes, seconds, frames", and this is troublesome for the narrator.

As a countermeasure against such problem, Japanese Published Patent Application No. Hei. 10-222967 disclosed a method for displaying countdown like "5", "4", "3", "2", "1" on the played video of the AV material in the section until reaching the narration recording start point. This method saves the narrator from the trouble of memorizing the time code at the narration recording start point.

However, since the narrator usually pays his/her attention to the manuscript of narration written on paper, it is troublesome for the narrator to take the timing to start narrating while watching both the video screen and the manuscript.

SUMMARY OF THE INVENTION

The present invention is made to solve the above-described problems and has for its object to provide a countdown audio generation apparatus and a countdown audio generation system which are able to inform the user of a predetermined timing by using countdown audio.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a countdown audio generation apparatus comprises a reproduction unit for reproducing a video signal and time information between which predetermined synchronization is maintained; a video output unit for outputting the video signal reproduced by the reproduction unit; a countdown audio generation unit for generating a countdown audio signal which informs that the time information reproduced by the reproduction unit reaches a predetermined countdown end time; and an audio output unit for outputting the countdown audio signal generated by the countdown audio generation unit. Therefore, a predetermined time (countdown end time) can be easily specified by the countdown audio.

According to a second aspect of the present invention, in the countdown audio generation apparatus of the first aspect, the countdown audio generation unit generates the countdown audio signal from when the time information has reached a time a predetermined period before the countdown end time.

According to a third aspect of the present invention, in the countdown audio generation apparatus of the first aspect, the countdown audio generation unit generates the countdown audio signal until the countdown end time.

According to a fourth aspect of the present invention, the countdown audio generation apparatus of the first aspect further comprises a text video generation unit for generating a text video signal indicating the contents equivalent to the contents described on a predetermined manuscript; video synthesis unit for synthesizing the text video signal and the reproduced video signal; and the video output unit outputting a synthetic video signal obtained by the video synthesis unit. Therefore, the user can see the played video and the test video at the same time.

According to a fifth aspect of the present invention, in the countdown audio generation apparatus of the first aspect, the reproduction unit reproduces an audio signal as well, and the audio output unit further outputs the audio signal reproduced by the reproduction unit. Therefore, the user of the apparatus can hear the played audio as well as the countdown audio, whereby the user can confirm the predetermined time more easily.

According to a sixth aspect of the present invention, the countdown audio generation apparatus of the fifth aspect further comprises an audio superposing unit for superposing the reproduced audio signal and the countdown audio signal; and the audio output unit outputting the reproduced audio signal and the countdown audio signal which have been superposed by the audio superposing unit.

According to a seventh aspect of the present invention, the countdown audio generation unit of the first aspect further comprises an external audio input unit to which an audio signal is supplied from the outside; a recording unit for recording the external audio signal supplied to the external audio input unit; and the audio output unit outputting the external audio signal as well. Therefore, the user can hear the external audio as well as the countdown audio. Further, the recorded external audio signal can be later used for editing or the like.

According to an eighth aspect of the present invention, the countdown audio generation apparatus of the seventh aspect further comprises an audio superposing unit for superposing the countdown audio signal and the external audio signal; and the audio output unit outputting the countdown audio signal and the external audio signal which have been superposed by the audio superposing unit.

According to a ninth aspect of the present invention, in the countdown audio generation apparatus of the seventh aspect, the recording unit records the video signal reproduced by the reproduction unit. Therefore, a storage medium on which the external audio signal and the reproduced video signal are recorded can be used for editing later.

According to a tenth aspect of the present invention, in the countdown audio generation apparatus of the seventh aspect, the reproduction unit reproduces an audio signal as well, and the audio output unit further outputs the audio signal reproduced by the reproduction unit. Therefore, the user can hear the countdown audio, the played audio, and the external audio with speakers or the like.

According to an eleventh aspect of the present invention, the countdown audio generation apparatus of the tenth aspect further comprises a first audio superposing unit for superposing the external audio signal and the reproduced audio signal; a second audio superposing unit for superposing the superposed audio signal obtained by the first superposing unit and the countdown audio signal; and the audio output unit outputting the countdown audio signal, the external audio signal, and the reproduced audio signal which have been superposed by the first and second superposing units.

According to a twelfth aspect of the present invention, in the countdown audio generation apparatus of the tenth aspect, the recording unit records the reproduced audio signal as well. Therefore, a storage medium on which the reproduced audio signal and the external audio signal are recorded can be later used for editing.

According to a thirteenth aspect of the present invention, the countdown audio generation apparatus of the twelfth aspect further comprises a first audio superposing unit for superposing the external audio signal and the reproduced audio signal; a second audio superposing unit for superposing the superposed audio signal obtained by the first audio superposing unit and the countdown audio signal; the audio output unit outputting the countdown audio signal, the external audio signal, and the reproduced audio signal which have been superposed by the first and second audio superposing units; and the recording unit recording the external audio signal and the reproduced audio signal which have been superposed by the first audio superposing unit.

According to a fourteenth aspect of the present invention, a countdown audio generation apparatus comprises a reproduction unit for reproducing an audio signal and time information between which predetermined synchronization is maintained; a countdown audio generation unit for generating a countdown audio signal from when the reproduced time information has reached a time a predetermined period before a predetermined countdown end time to when the countdown end time comes; an external audio input unit to which an audio signal is supplied from the outside; and an audio output unit for outputting the countdown audio signal, the reproduced audio signal obtained by the reproduction unit, and the external audio signal inputted to the external audio input unit. Therefore, the user can hear the external audio and the played audio together with the countdown audio. For example, when this countdown audio generation apparatus is used for karaoke, even a person who is not good at taking the timing to start singing can easily take the timing by hearing the countdown audio.

According to a fifteenth aspect of the present invention, in the countdown audio generation apparatus of the fourteenth aspect, the countdown audio generation unit generates the countdown audio signal on the basis of the rhythm of audio reproduced by the reproduction unit. Therefore, when this apparatus is used for karaoke, the user can easily confirm the singing start point in karaoke.

According to a sixteenth aspect of the present invention, the countdown audio generation apparatus of the fourteenth aspect further comprises the reproduction unit reproducing a video signal as well; and a video output unit for outputting the video signal reproduced by the reproduction unit.

According to a seventeenth aspect of the present invention, the countdown audio generation apparatus of the fourteenth aspect further comprises a first audio superposing unit for superposing the external audio signal and the reproduced audio signal; a second audio superposing unit for superposing the superposed audio signal obtained by the first audio superposing unit and the countdown audio signal; the audio output unit outputting the countdown audio signal, the external audio signal, and the reproduced audio signal which have been superposed by the first and second audio superposing units.

According to an eighteenth aspect of the present invention, a countdown audio generation system comprises a countdown audio generation apparatus and an audio transmission/reception apparatus. The countdown audio generation apparatus comprises a reproduction unit for reproducing an audio signal and time information between which predetermined synchronization is maintained; a countdown audio generation unit for generating a countdown audio signal from when the reproduced time information has reached a time a predetermined period before a predetermined countdown end time to when the countdown end time comes; a first external audio input unit to which an audio signal is supplied from the outside; a first transmission/reception unit for transmitting the countdown audio signal, the reproduced audio signal obtained by the reproduction unit, and the external audio signal inputted to the external audio input unit, to the audio transmission/reception apparatus, and receiving an audio signal transmitted from the audio transmission/reception apparatus; and a first audio output unit for outputting the countdown audio signal, the reproduced audio signal, the external audio signal, and the audio signal received by the first transmission/reception unit. The audio transmission/reception apparatus comprises a second external audio input unit to which an audio signal is supplied from the outside; a second transmission/reception unit for receiving the audio signals transmitted from the countdown audio generation apparatus, and transmitting the external audio signal inputted to the second external audio input unit, to the countdown audio generation apparatus; and a second audio output unit for outputting the audio signals received by the second transmission/reception unit, and the external audio signal inputted to the second external audio input unit. Therefore, plural users in separated places can hear the same countdown audio. Further, each of the users can hear the external audio inputted to the other user's end.

According to a nineteenth aspect of the present invention, in the countdown audio generation system of the eighteenth aspect, the countdown audio generation unit generates the countdown audio signal on the basis of the rhythm of audio reproduced by the reproduction unit.

According to a twentieth aspect of the present invention, in the countdown audio generation system of the eighteenth aspect, a plurality of audio transmission/reception apparatuses correspond to one countdown audio generation apparatus.

DETAILED DESCRIPTION OF THE PREFERRED EMBODIMENTS

Embodiment 1

Hereinafter, a countdown audio generation apparatus according to a first embodiment of the present invention will be described with reference to the drawings.

Figure 1:
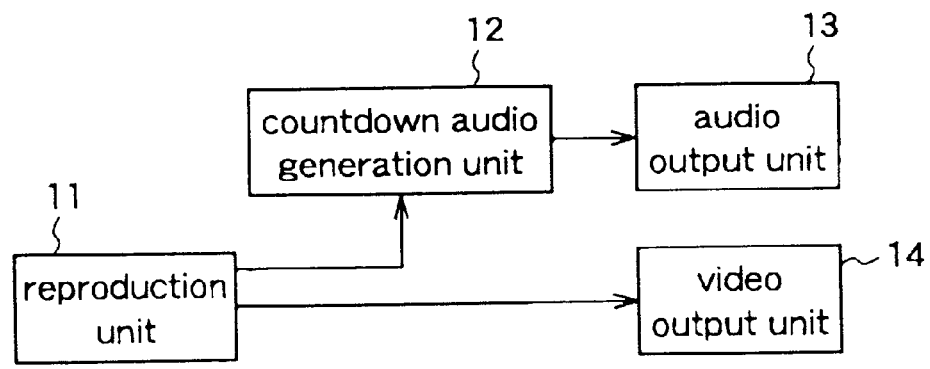
FIG. 1 is a block diagram illustrating a countdown audio generation apparatus according to a first embodiment of the present invention.

FIG. 1 is a block diagram illustrating the structure of a countdown audio generation apparatus according to the first embodiment.

In FIG. 1, the countdown audio generation apparatus comprises a reproduction unit 11, a countdown audio generation unit 12, an audio output unit 13, and a video output unit 14.

The reproduction unit 11 reproduces an AV signal comprising a video signal, an audio signal, and time information among which predetermined synchronization is maintained, from a storage medium on which the signal is recorded. Then, the reproduction unit 11 outputs the time information to the countdown audio generation unit 12, and the reproduced video signal to the video output unit 14. The time information indicates the progress time of video and audio on the basis of predetermined positions of video and audio. For example, it is displayed as "1 hour, 23 minutes, 45 seconds, 6 frames" (hereinafter referred to as "01:23:45:06"). In this first embodiment, the signal reproduced by the reproduction unit 11 may include no audio signal.

The countdown audio generation unit 12 receives the time information from the reproduction unit 11, and generates a countdown audio signal for informing the user that the time information reaches a countdown end time which has been set in advance. That is, the countdown audio generation unit 12 generates the countdown audio signal from when the time information has reached a time a predetermined period before the countdown end time to when the countdown end time comes, and outputs the countdown audio signal to the audio output unit 13.

The countdown audio is a sound for informing the user of the countdown end time. For example, a beep is used. Since a complicated audio processor such as an equalizer is not necessary to generate a beep, the countdown audio can be generated by an inexpensive circuit. Further, the countdown end time is a predetermined time to be recognized by the user, and this is set in the countdown audio generation unit 12 in advance.

The countdown end time may be manually set in the countdown audio generation unit 12 by the user with a ten-key pad or the like. Alternatively, the countdown end time may be superposed on the AV signal recorded in the storage medium to be played back by the reproduction unit 11. In this case, the reproduction unit 11 reads the countdown end time from the medium, and outputs it to the countdown audio generation unit 12, whereby the countdown end time is set in the unit 12.

The audio output unit 13 is an interface which receives the countdown audio signal from the countdown audio generation unit 12, and outputs it to headphones (not shown) or speakers (not shown).

The video output unit 14 receives the reproduced video signal from the reproduction unit 11, and outputs it to an external monitor (not shown).

Next, the operation of the countdown audio generation apparatus will be described.

The reproduction unit 11 reproduces the video signal and the time information recorded on the storage medium, and outputs the reproduced video signal and time information to the video output unit 14 and the countdown audio generation unit 12, respectively. Then, the video output unit 14 outputs the input video signal to the external monitor, and the video is displayed on the monitor.

Figure 2:
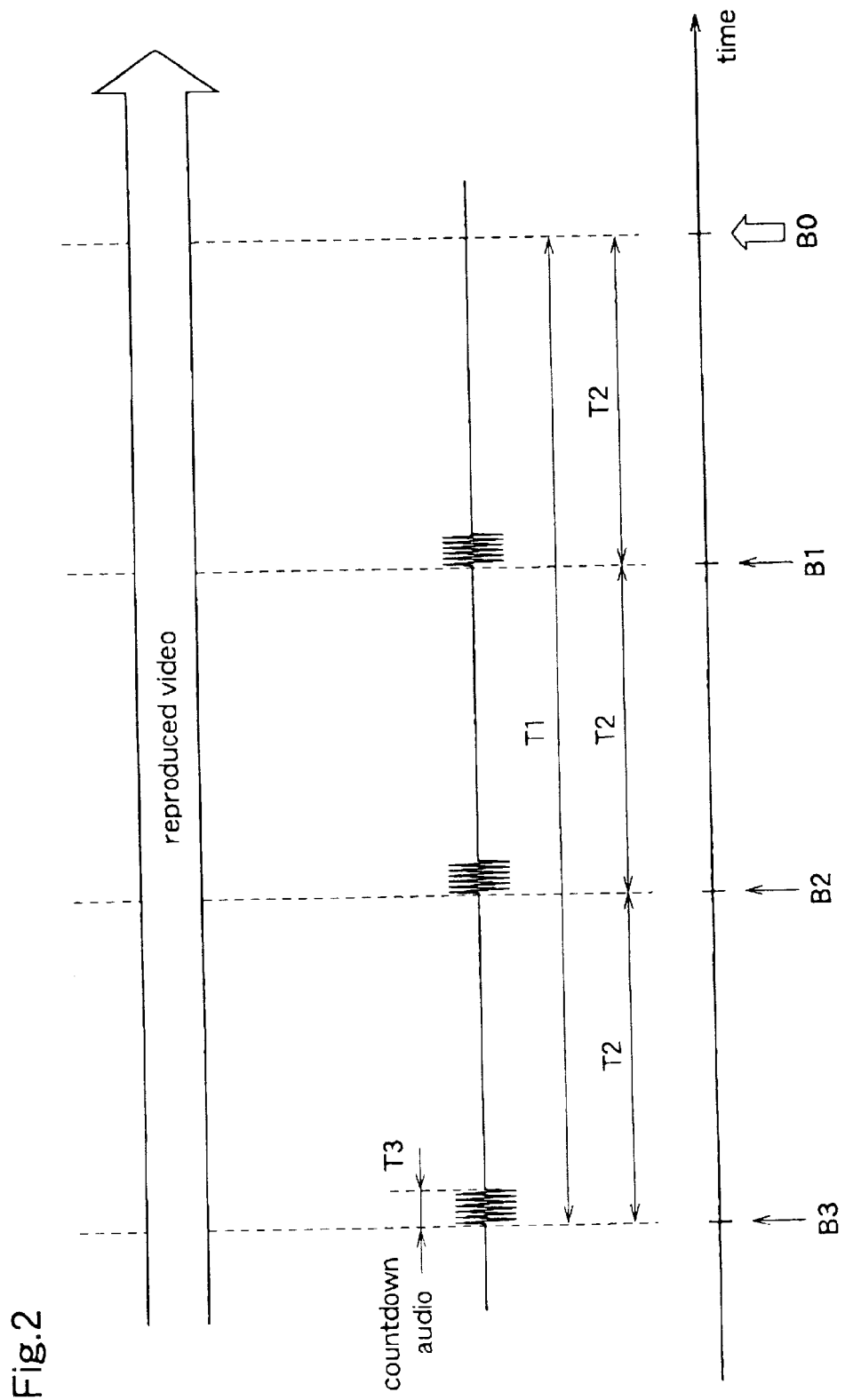
FIG. 2 is a diagram for explaining the timing to generate countdown audio according to the first embodiment.

FIG. 2 is a diagram for explaining the timing to generate the countdown audio signal.

In FIG. 2, "reproduced video" indicates a video signal reproduced by the reproduction unit 11 and outputted from the video output unit 14 to the external monitor. Further, "countdown audio" indicates an audio signal generated by the countdown audio generation unit 12.

In the countdown audio generation unit 12, a countdown end time B0 is set in advance as a time to end generation of the countdown audio signal. Then, the generation unit 12 receives the time information from the reproduction unit 11, and generates a beep of period T3 as the countdown audio when the time indicated by the time information has reached a time (time B3) a predetermined time (period T1) before the countdown end time B0.

When period T2 has passed from time B3 (i.e., at time B2), the countdown audio generation unit 12 generates a beep of period T3 as the countdown audio. Further, when period T2 has passed from time B2 (i.e., at time B1), it generates a beep of period T3 as the countdown audio. Thus, the countdown audio is these beeps which are generated each for a predetermined period (T3) at times B3, B2, and B1 and then outputted through the audio output unit 13. By the three beeps as the countdown audio, the user hearing this countdown audio can know the countdown end time (B0) which has been previously set in the countdown audio generation unit 12. The above-described periods T1, T2, and T3 are also set in the countdown audio generation unit 12.

Next, the operation of the countdown audio generation apparatus will be described using an example.

In this example, it is assumed that the countdown audio generation apparatus is used for indicating a narration start point when narration audio is inserted in a section of a magnetic tape on which a video signal has already been recorded. That is, the countdown end time corresponds to the narration start time, and the narrator starts reading the manuscript of narration from this start time.

In the countdown audio generation unit 12, "00:45:35:05" has already been set as the narration start time (countdown end time B0). The narrator sets a magnetic tape, on which a video signal and time information are recorded, in a reproduction apparatus (not shown). When reproduction of the video signal and the time information is started, the reproduction means 11 (e.g., a reproducing head of the reproduction apparatus) reproduces the video signal and the time information recorded on the magnetic tape from a time sufficiently before "00:45:35:05", and outputs the reproduced video signal to the video output unit 14, and the time information to the countdown audio generation unit 12. The narrator can see the played video with a monitor (not shown) connected to the video output unit 14.

Assuming that 3 sec., 1 sec., and 0.1 sec. are set as periods T1, T2, and T3 shown in FIG. 2, respectively. In this case, the countdown audio generation unit 12 generates a beep of 0.1 sec. when the time information has become "00:45:32:05" and, thereafter, it generates a beep of 0.1 sec. each time the time information has become "00:45:33:05" and "00:45:34:05". Then, the audio signals of the beeps so generated are output to the audio output unit 13, whereby the narrator can hear the beeps with headphones (not shown). When the three beeps have been output, the narrator starts reading the manuscript of narration. Thus, the narrator knows the narration start point while watching the manuscript, and starts reading the manuscript from the narration start time "00:45:35:05". The narration audio as the contents of narration read by the narrator is recorded on a desired storage medium (not shown) through a microphone (not shown) and an audio recorder (not shown), and it is used for editing later.

As described above, the countdown audio generation apparatus of this first embodiment is provided with the countdown audio generation unit 12 which generates a countdown audio signal from a time a predetermined period before a predetermined time, to the predetermined time. Therefore, the predetermined time can be easily indicated by the countdown audio. For example, when the countdown audio generation apparatus is used for recording of narration, even an inexpert narrator can take the narration start timing by the countdown audio while concentrating on the manuscript of narration.

Further, when the narrator hears the countdown audio with headphones, the countdown audio is prevented from mixing into the narration audio.

Embodiment 2

Hereinafter, a countdown audio generation apparatus according to a second embodiment of the present invention will be described with reference to the drawings.

Figure 3:
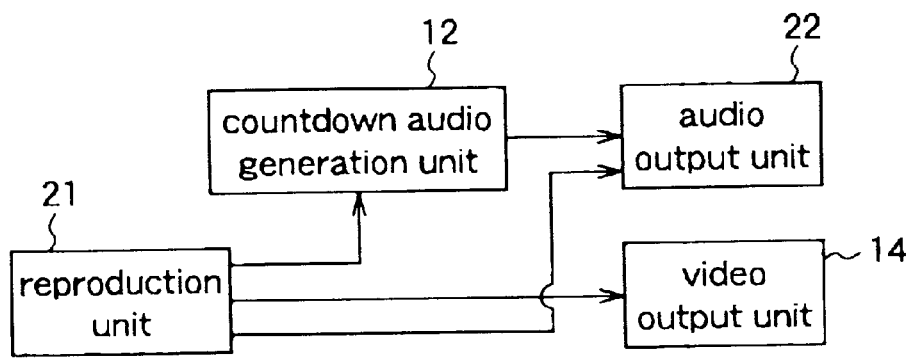
FIG. 3 is a block diagram illustrating a countdown audio generation apparatus according to a second embodiment of the present invention.

FIG. 3 is a block diagram illustrating the structure of a countdown audio generation apparatus according to the second embodiment.

In FIG. 3, the countdown audio generation apparatus comprises a reproduction unit 21, a countdown audio generation unit 12, an audio output unit 22, and a video output unit 14. The constituents other than the reproduction unit 21 and the audio output unit 22 are identical to those of the countdown audio generation apparatus of the first embodiment and, therefore, do not require repeated description.

The reproduction unit 21 reproduces an AV signal comprising a video signal, an audio signal, and time information among which predetermined synchronization is maintained, from a storage medium on which the signal is recorded. Then, the reproduction unit 21 outputs the time information to the countdown audio generation unit 12, the reproduced video signal to the video output unit 14, and the reproduced audio signal to the audio output unit 22.

The audio output unit 22 is an interface which receives the countdown audio signal from the countdown audio generation unit 12 and the reproduced audio signal from the reproduction unit 21, and outputs them to headphones (not shown) or speakers (not shown). For example, the audio output unit 22 outputs the countdown audio signal to the right-side headphone (or right-side speaker) and the reproduced audio signal to the left-side headphone (or left-side speaker).

The operation of the countdown audio generation apparatus of this second embodiment is identical to that of the countdown audio generation apparatus of the first embodiment except that the reproduction unit 21 reproduces the audio signal as well, and the audio output unit 22 outputs the reproduced audio signal as well.

As described above, in the countdown audio generation apparatus of this second embodiment, since the reproduction unit 21 reproduces the audio signal and outputs it to the audio output unit 22, the user of the apparatus can hear the played audio as well as the countdown audio, in addition to the effects provided by the first embodiment. Therefore, the user can confirm the predetermined time more easily. For example, when the countdown audio generation apparatus is used for recording of narration, since the narrator can hear the played audio as well as the countdown audio, the narrator can take the narration start timing more easily.

Embodiment 3

Hereinafter, a countdown audio generation apparatus according to a third embodiment of the present invention will be described with reference to the drawings.

Figure 4:
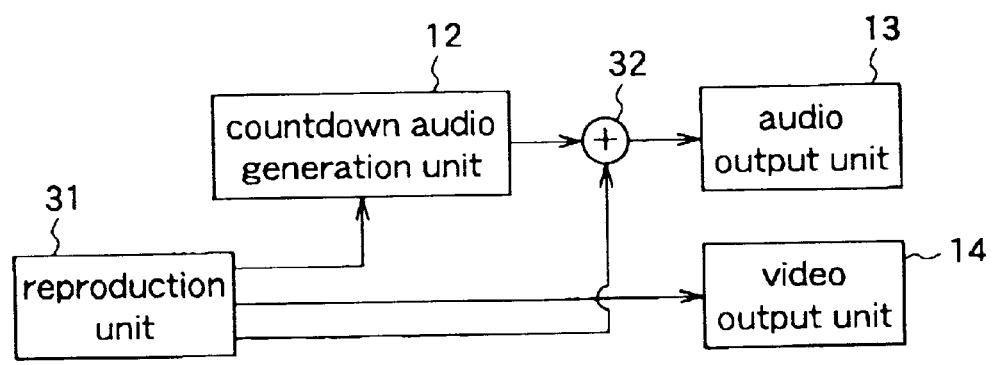
FIG. 4 is a block diagram illustrating a countdown audio generation apparatus according to a third embodiment of the present invention.

FIG. 4 is a block diagram illustrating the structure of a countdown audio generation apparatus according to the third embodiment.

With reference to FIG. 4, the countdown audio generation apparatus comprises a reproduction unit 31, a countdown audio generation unit 12, an audio output unit 13, a video output unit 14, and an audio superposing unit 32. The constituents other than the reproduction unit 31 and the audio superposing unit 32 are identical to those of the apparatus according to the first embodiment and, therefore, do not require repeated description.

The reproduction unit 31 reproduces an AV signal comprising a video signal, an audio signal, and time information among which predetermined synchronization is maintained, from a storage medium on which the signal is recorded. Then, the reproduction unit 31 outputs the time information to the countdown audio generation unit 12, the reproduced video signal to the video output unit 14, and the reproduced audio signal to the audio superposing unit 32.

The audio superposing unit 32 receives the countdown audio signal from the countdown audio generation unit 12 and the reproduced audio signal from the reproduction unit 31, and superposes these signals at a predetermined gain to output them to the audio output unit 13. The output unit 13 outputs the superposed countdown audio signal and reproduced audio signal to headphones (not shown) or speakers (not shown).

The operation of the countdown audio generation apparatus of this third embodiment is identical to that of the apparatus according to the first embodiment except that the reproduction unit 31 reproduces the audio signal as well, the audio superposing unit 32 superposes the countdown audio signal on the reproduced audio signal, and the audio output unit 13 outputs the superimposed audio signal.

As described above, in the countdown audio generation apparatus according to the third embodiment, the reproduction unit 31 reproduces the audio signal as well, and the audio output unit 13 outputs an audio signal obtained by superposing the reproduced audio signal and the countdown audio signal. Since the user of the apparatus can hear the played audio as well as the countdown audio, the user can conform the predetermined time more easily, in addition to the effects provided by the first embodiment. For example, when the countdown audio generation apparatus is used for recording of narration, since the narrator can hear both the countdown audio and the played audio, the narrator can take the narration start timing more easily.

Embodiment 4

Hereinafter, a countdown audio generation apparatus according to a fourth embodiment of the present invention will be described with reference to the drawing.

Figure 5:
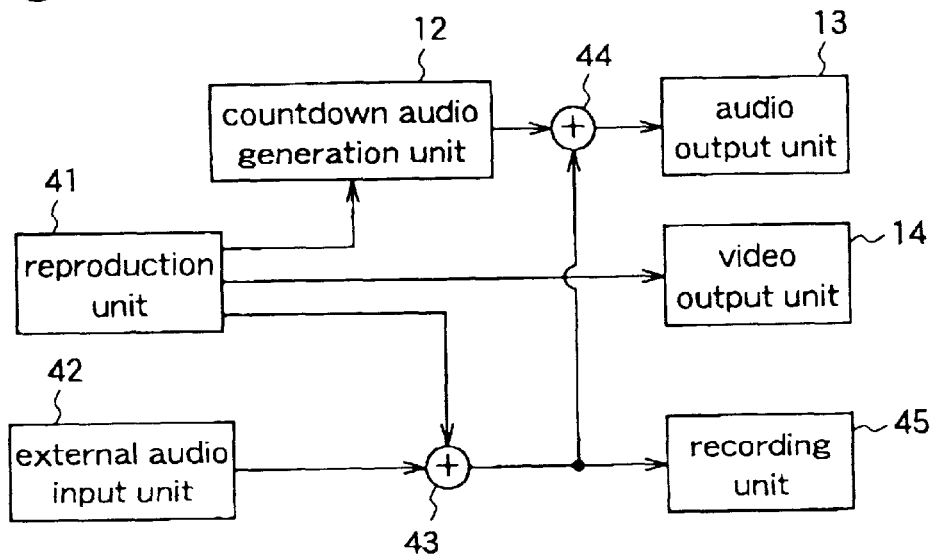
FIG. 5 is a block diagram illustrating a countdown audio generation apparatus according to a fourth embodiment of the present invention.

FIG. 5 is a block diagram illustrating the structure of a countdown audio generation apparatus according to the fourth embodiment.

With reference to FIG. 5, the countdown audio generation apparatus comprises a reproduction unit 41, a countdown audio generation unit 12, an audio output unit 13, a video output unit 14, an external audio input unit 42, a first audio superposing unit 43, a second audio superposing unit 44, and a recording unit 45. The constituents other than the reproduction unit 41, the external audio input unit 42, the first audio superposing unit 43, the second audio superposing unit 44, and the recording unit 45 are identical to those of the apparatus according to the first embodiment and, therefore, do not require repeated description.

The reproduction unit 41 reproduces an AV signal comprising a video signal, an audio signal, and time information among which predetermined synchronization is maintained, from a storage medium on which the signal is recorded. Then, the reproduction unit 41 outputs the time information to the countdown audio generation unit 12, the reproduced video signal to the video output unit 14, and the reproduced audio signal to the first audio superposing unit 32.

The external audio input unit 42 is an interface which receives an external audio signal supplied from the outside of the countdown audio generation apparatus. For example, it receives an audio signal from a microphone (not shown). The input external audio signal is output to the first audio superposing unit 43.

The first audio superposing unit 43 receives the reproduced audio signal from the reproduction unit 41 and the external audio signal from the external audio input unit 42, and superposes these signals at a predetermined gain. The superposed audio signal is sent to the recording unit 45 and to the second audio superposing unit 44.

The second audio superposing unit 44 receives the countdown audio signal from the countdown audio generation unit 12 and the superposed audio signal from the first audio superposing unit 43, and superposes these signals at a predetermined gain. The superposed audio signal is sent to the audio output unit 13.

The recording unit 45 records the reproduced audio signal and the external audio signal which have been superposed by the first audio superposing unit 43, on a predetermined storage medium, such as a magnetic tape, a magnetic disk, a magneto-optical disk, or a RAM (Random Access Memory).

Next, a description will be given of the operation of the countdown audio generation apparatus.

The reproduction unit 41, the countdown audio generation unit 12, the audio output unit 13, and the video output unit 14 operate in the same manner as described for the first embodiment except that the reproduction unit 41 reproduces the audio signal as well, and the audio output unit 13 outputs the superposed audio signal obtained by the second audio superposing unit 44.

The external audio input unit 42 receives an audio signal supplied from the outside of the countdown audio generation apparatus through a microphone or the like. The external audio input unit 42 outputs the external audio signal to the first audio superposing unit 43. The first audio superposing unit 43 superposes the reproduced audio signal from the reproduction unit 41 and the external audio signal from the external audio input unit 42 at a predetermined gain, and outputs the superposed audio signal to the second audio superposing unit 44 and to the recording unit 45. The recording unit 45 records the superposed audio signal on a predetermined storage medium.

Further, the second audio superposing unit 44 superposes the superposed audio signal (superposed reproduced audio signal and external audio signal) and the countdown audio signal, and outputs the superposed audio signal to the audio output unit 13.

Next, the operation of the countdown audio generation apparatus will be described using an example.

Also in this fourth embodiment, it is assumed that the countdown audio generation apparatus is used for indicating the narration start point when inserting narration audio in a section of a magnetic disk on which a video signal has already been recorded. The timing to generate a countdown audio signal is identical to that described for the first embodiment and, therefore, does not require repeated description.

In the countdown audio generation apparatus of this fourth embodiment, the narration input to a microphone is recorded together with the reproduced audio signal.

The narrator can hear the played audio with headphones while watching the played video on an external monitor (not shown). When the countdown audio starts from a predetermined time (e.g., "00:45:32:05"), the narrator hears this with the headphones and starts reading the narration from the narration start time (e.g., "00:45:35:05"). The narration audio as the contents read by the narrator is sent to the first audio superposing unit 43 and to the second audio superposing unit 44 through the microphone and the external audio input unit 42, and it is superposed on the reproduced audio signal and the countdown audio signal. Therefore, the narrator can hear the narration audio with the played audio and the countdown audio. Further, the narration audio signal which has been superposed on the reproduced audio signal by the first audio superposing unit 43 is recorded on a predetermined storage medium in the recording unit 45. The recorded audio signal is later used for editing.

As described above, in the countdown audio generation apparatus according to this fourth embodiment, the reproduction unit 41 reproduces the audio signal as well, and the user can hear the audio in which the played audio and the countdown audio are superposed. Therefore, in addition to the effects provided by the first embodiment, the user can recognize the predetermined time more easily. Further, the user can hear the external audio supplied from the outside as well as the played audio and the countdown audio. Moreover, since the apparatus is provided with the recording unit 45 for recording the reproduced audio signal and the external audio signal, these signals recorded on a storage medium can be used for editing later. For example, when the countdown audio generation apparatus is applied to recording of narration, a storage medium on which the reproduced audio signal and the narration audio signal are superposed is obtained, and this storage medium can be used for another editing work.

In this fourth embodiment, the audio output unit 13 outputs the audio signal which is obtained by superposing the external audio signal, the reproduced audio signal, and the countdown audio signal by the first and second audio superposing units 43 and 44. However, this is only one example, and the audio output unit 13 may output the countdown audio signal separately from the superposed signal of the other two audio signals (the external audio signal and the reproduced audio signal), like the audio output unit 22 of the second embodiment. Further, the combination of two signals to be output from the audio output unit 13 is as follows: the external audio signal and the superposed signal of the other two signals (the reproduced audio signal and the countdown audio signal), or the reproduced audio signal and the superposed signal of the other two signals (the countdown audio signal and the external audio signal).

Further, in this fourth embodiment, the reproduction unit 41 reproduces the audio signal, and the audio output unit 13 outputs the reproduced audio signal from the reproduction unit 41. However, this is only one example, and the audio output unit 13 may output no reproduced audio signal.

Further, in this fourth embodiment, the recording unit 45 records the audio signal obtained by superposing the reproduced audio signal from the reproduction unit 41 and the external audio signal from the external audio input unit 42. However, this is only one example, and the recording unit 45 may record only the external audio signal on the storage medium. The external audio signal recorded on the storage medium can be used for non-linear editing.

Figure 6:
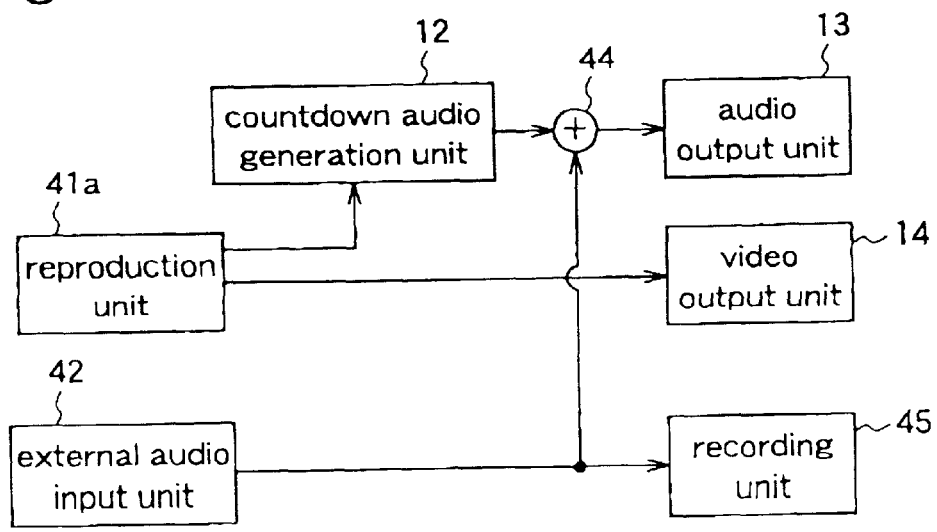
FIG. 6 is a block diagram illustrating a countdown audio generation apparatus according to a modification of the fourth embodiment.

FIG. 6 is a block diagram illustrating the structure of a countdown audio generation apparatus in which the played audio is not output and only the external audio is recorded.

The countdown audio generation apparatus shown in FIG. 6 is identical to the countdown audio generation apparatus shown in FIG. 5 except that it does not have a first audio superposing unit 43, and the reproduction unit 41 is replaced with a reproduction unit 41*a* which does not reproduce the audio signal.

Figure 7:
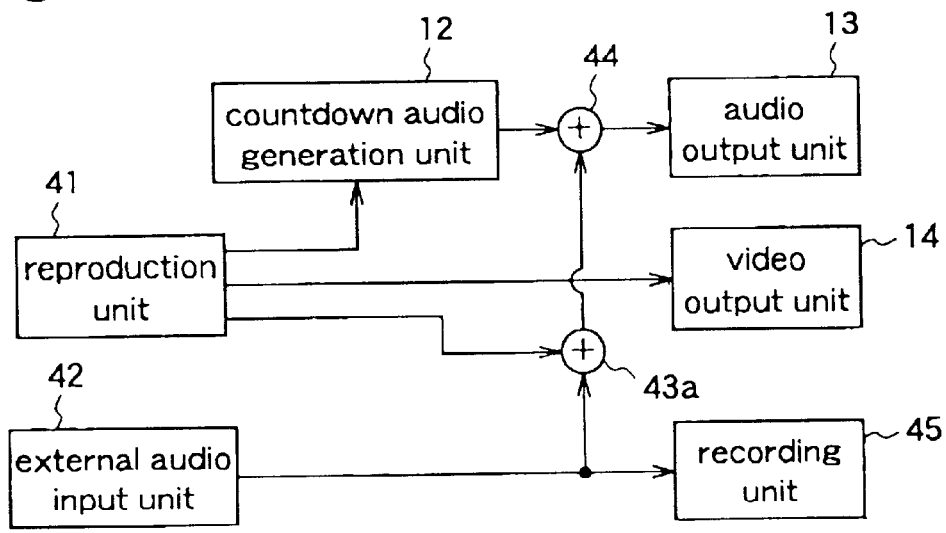
FIG. 7 is a block diagram illustrating a countdown audio generation apparatus according to another modification of the fourth embodiment.

FIG. 7 is a block diagram illustrating the structure of a countdown audio generation apparatus in which only the external audio is recorded.

The countdown audio generation apparatus shown in FIG. 7 is identical to the countdown audio generation apparatus shown in FIG. 5 except that the first audio superposing unit 43 is replaced with a first audio superposing unit 43*a*.

Further, when the reproduction unit 41 and the recording unit 45 are a player and a recorder, respectively, a storage medium played by the player 41 may be different from a storage medium used in the recorder 45. When the reproduction unit 41 and the recording unit 45 are a reproduction part and a recording part of a head of a playback/recording apparatus, respectively, playback and recording may be performed from/on the same storage medium.

Further, the video reproduced by the reproduction unit 41 may be recorded by the recording unit, together with the reproduced audio signal and the external audio signal.

Furthermore, after the countdown end time, the output level of the played audio may be reduced so that the user can concentrate on the external audio.

Embodiment 5

Hereinafter, a countdown audio generation apparatus according to a fifth embodiment of the present invention will be described with reference to the drawings.

Figure 8:
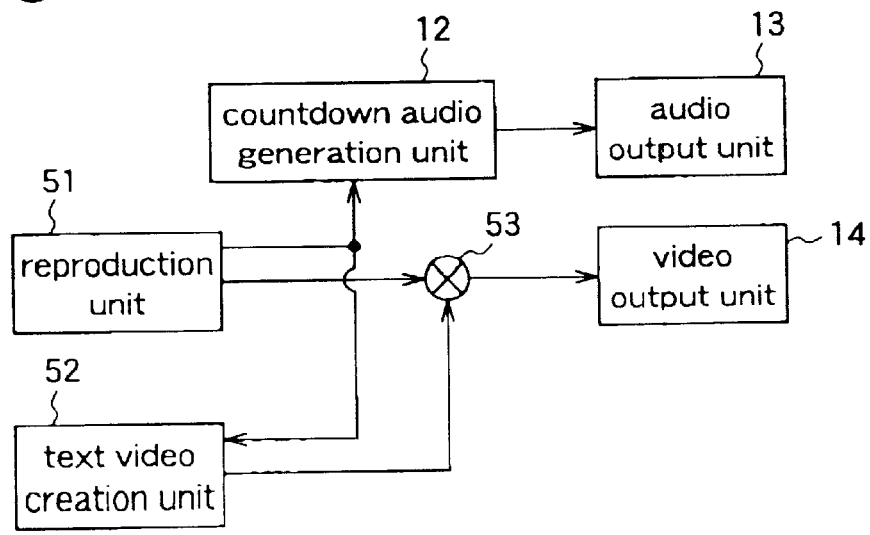
FIG. 8 is a block diagram illustrating a countdown audio generation apparatus according to a fifth embodiment of the present invention.

FIG. 8 is a block diagram illustrating the structure of a countdown audio generation apparatus according to the fifth embodiment.

With reference to FIG. 8, the countdown audio generation apparatus comprises a reproduction unit 51, a countdown audio generation unit 12, an audio output unit 13, a video output unit 14, a text video generation unit 52, and a video synthesis unit 53. The constituents of the apparatus other than the reproduction unit 51, the text video generation unit 52, and the video synthesis unit 53 are identical to those of the countdown audio generation apparatus of the first embodiment and, therefore, do not require repeated description.

The reproduction unit 51 reproduces an AV signal comprising a video signal, an audio signal, and time information among which predetermined synchronization is maintained, from a storage medium (not shown) on which the signal is recorded. Then, the reproduction unit 51 outputs the time information to the countdown audio generation unit 12 and to the text video generation unit 52, and the reproduced video signal to the video output unit 14. In this fifth embodiment, the signal reproduced by the reproduction unit 51 may include no audio signal.

The text video generation unit 52 receives the time information from the reproduction unit 51, and generates a text video signal which indicates the contents equivalent to the contents written on a predetermined manuscript, from when the time information has reached a time a predetermined period before a countdown end time which has previously been set. Setting of the countdown end time in the text video generation unit 52 is performed in like manner as setting of it in the countdown audio generation unit 12.

The video synthesis unit 53 receives the reproduced video signal from the reproduction unit 51 and the text video signal from the text video generation unit 52, and synthesizes these signals to output a synthetic signal to the video output unit 14.

Next, the operation of the countdown audio generation apparatus will be described.

Generation of countdown audio is identical to that already described for the countdown audio generation apparatus of the first embodiment and, therefore, does not require repeated description.

The text video generation unit 52 receives the time information from the reproduction unit 51, and generates a text video signal which indicates the contents equivalent to the contents written on a predetermined manuscript, from when the time information has reached a time a predetermined period before a countdown end time which has previously been set. The text video signal so generated is output to the video synthesis unit 53, wherein it is synthesized with the reproduced video signal supplied from the reproduction unit 51, and a synthetic signal so obtained is output to the video output unit 14. The video output unit 14 outputs the synthetic video signal to an external monitor (not shown). The external monitor displays the video in which the reproduced video and the text video are synthesized.

Next, the operation of the countdown audio generation apparatus will be described by using an example.

Also in this example, like the example of the first embodiment, the countdown audio generation apparatus is used for indicating the narration start point when narration audio is inserted in a section of a magnetic tape on which a video signal has already been recorded. The timing to generate a countdown audio signal is identical to that described for the example of the first embodiment and, therefore, does not require repeated description.

The narrator mounts a storage medium on which text data of a narration manuscript is recorded, on the text video generation unit 52. The narration start time is previously set in the text video generation unit 52 as well as in the countdown audio generation unit 12. The text video generation unit 52 does not generate a text video signal until the time information supplied from the reproduction unit 51 reaches a time a predetermined period before the narration start time. Accordingly, only the reproduced video signal is input to the video synthesis unit 53 and, therefore, only the reproduced video is output to the video output unit 14.

The text video generation unit 52 reads the text data from the storage medium, from when the time information reaches a time a predetermined period before the narration start time, and generates a text video signal indicating the contents of the text data, and outputs the signal to the video synthesis unit 53. The video synthesis unit 53 synthesizes the text video signal and the reproduced video signal, and outputs a synthetic video signal so obtained to the video output unit 14. The video output unit 14 displays the synthetic video on the external monitor, whereby the narrator can confirm the contents of the narration manuscript with the external monitor. Then, the narrator knows the narration start time by the countdown audio supplied from the audio output unit 13, and starts reading the contents of the narration manuscript which is displayed on the external monitor.

Next, a description will be given of a case where narration is recorded on CM video of a hamburger shop.

Figure 9:
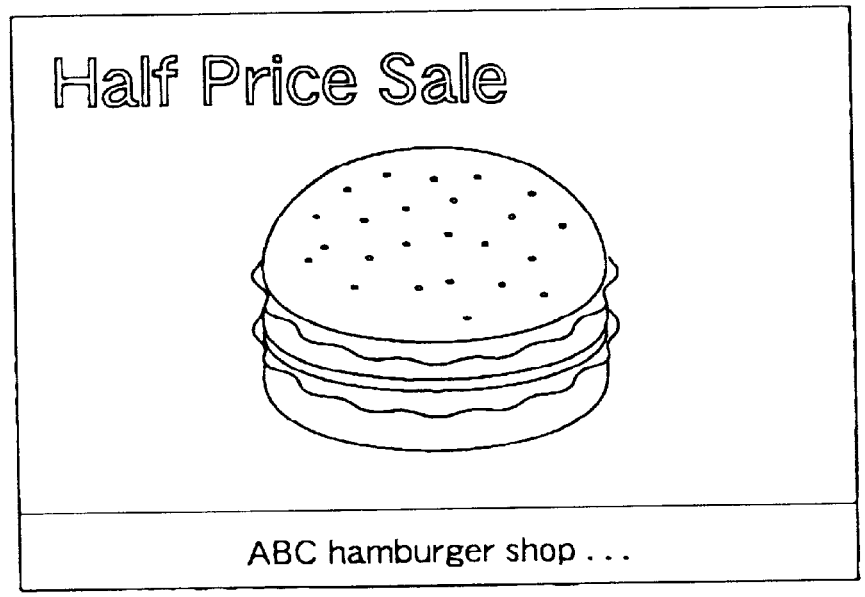
FIG. 9 is a diagram illustrating examples of played-back video and text video, displayed on a monitor.

FIG. 9 is a diagram showing examples of played video and text video displayed on a monitor.

As shown in FIG. 9, the played video of the CM is displayed on the upper part of the monitor while the text video which is the contents of the narration manuscript is displayed on the lower part of the monitor. Although only a part of the narration manuscript is displayed on the lower part of the monitor, since the text of the narration manuscript is scrollable from right to left, the narrator can read the text successively. The scrolling speed may be decided in advance, like a predetermined number of characters per second. However, the narrator may control the scrolling speed from the outside of the text video generation unit 52. Alternatively, the scrolling speed may be determined by inverse counting from the narration end time. The narrator knows the narration start point by the countdown audio, and starts narrating by reading the text displayed on the monitor. The narration is recorded on a desired storage medium (not shown) through a microphone (not shown) and an audio recorder (not shown), and it is later used for editing.

As described above, in the countdown audio generation apparatus according to the fifth embodiment, since the text video signal is synthesized with the reproduced video signal, the user can see the played video and the text video at the same time, in addition to the effects provided by the first embodiment. For example, when the countdown audio generation apparatus is used for recording of narration, the narrator can read the narration (text) displayed on the monitor, with no necessity of paying attention to the manuscript written on paper.

In this fifth embodiment, the text video generation unit 52 is supplied with the text data recorded on the storage medium, and generates the text video signal from the text data. However, this is only one example, and the text video generation unit 52 may be supplied with the text of the paper manuscript as it is (i.e., as image data), and the unit 52 may output the image data to the video synthesis unit 53.

Further, although in this fifth embodiment the text video signal is output to the video output unit 14 from a time predetermined period before the countdown end time, this is only one example. A part of the text to be displayed first may be displayed from the beginning, and scrolling of the displayed text video may be started from the countdown end time.

Further, although in this fifth embodiment the countdown audio generation apparatus according to the first embodiment is provided with the text video generation unit 52, the countdown audio generation apparatuses according to the second to fourth embodiments may be provided with the text video generation unit 52.

Embodiment 6

Hereinafter, a countdown audio generation apparatus according to a sixth embodiment of the present invention will be described with reference to the drawings.

Figure 10:
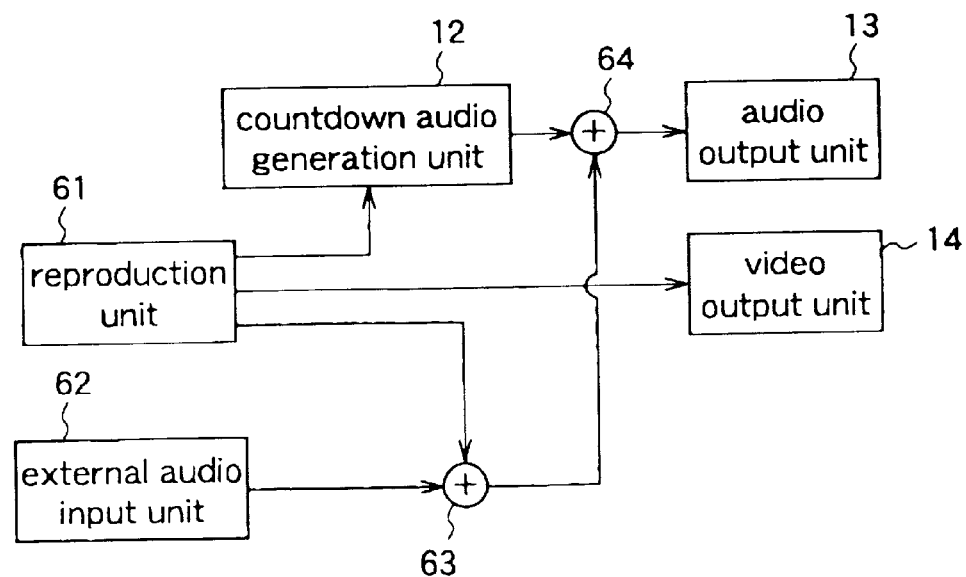
FIG. 10 is a block diagram illustrating a countdown audio generation apparatus according to a sixth embodiment of the present invention.

FIG. 10 is a block diagram illustrating the structure of a countdown audio generation apparatus according to the sixth embodiment.

With reference to FIG. 10, the countdown audio generation apparatus comprises a reproduction unit 61, a countdown audio generation unit 12, an audio output unit 13, a video output unit 14, an external audio input unit 62, a first audio superposing unit 63, and a second audio superposing unit 64. The constituents other than the reproduction unit 61, the external audio input unit 62, and the first and second audio superposing units 63 and 64 are identical to those described for the countdown audio generation apparatus of the first embodiment and, therefore, do not require repeated description.

The reproduction unit 61 reproduces an AV signal comprising a video signal, an audio signal, and time information among which predetermined synchronization is maintained, from a storage medium on which the signal is recorded. Then, the reproduction unit 61 outputs the time information to the countdown audio generation unit 12, the reproduced video signal to the video output unit 14, and the reproduced audio signal to the first audio superposing unit 63.

The external audio input unit 62 is an interface which receives an external audio signal supplied from the outside of the countdown audio generation apparatus. For example, the external audio input unit 62 receives an audio signal from a microphone (not shown) or the like. The input audio signal is output to the first audio superposing unit 63.

The first audio superposing unit 63 receives the reproduced audio signal from the reproduction unit 61 and the external audio signal from the external audio input unit 62, and superposes these signals at a predetermined gain. The superposed audio signal is sent to the second audio superposing unit 64.

The second audio superposing unit 64 receives the countdown audio signal from the countdown audio generation unit 12 and the superposed audio signal from the first audio superposing unit 63, and superposes these signals at a predetermined gain. The superposed audio signal is sent to the audio output unit 13.

Next, the operation of the countdown audio generation apparatus will be described.

The reproduction unit 61, the countdown audio generation unit 12, the audio output unit 13, and the video output unit 14 operate in the same manner as already described for the first embodiment except that the reproduction unit 61 reproduces the audio signal as well, and the audio output unit 13 outputs the superposed signal obtained by the audio superposing units 63 and 64.

Initially, an audio signal is supplied from the outside of the countdown audio generation apparatus to the external audio input unit 62 through a microphone or the like. The external audio input unit 62 outputs the external audio signal to the first audio superposing unit 63. The first audio superposing unit 63 superposes the reproduced audio signal from the reproduction unit 61 and the external audio signal from the external audio input unit 62 at a predetermined gain, and outputs the superposed audio signal to the second audio superposing unit 64.

Further, the superposed audio signal (reproduced audio signal and external audio signal) input to the second audio superposing unit 64 is further superposed with the countdown audio signal, and the superposed audio signal is output to the audio output unit 13.

Next, the operation of the countdown audio generation apparatus will be described using an example.

In this example, the countdown audio generation apparatus is used in karaoke, for indicating the point where the user should start singing. FIG. 2 is used to explain the timing to generate a countdown audio signal.

It is assumed that, in the countdown audio generation unit 12, "00:00:35:00" has previously been set as the time at the singing start point, i.e., the countdown end time B0 at which the countdown audio signal is ended. The user sets a magnetic tape on which a video signal, an audio signal of karaoke, and time information are recorded, in a reproduction apparatus (not shown). When playback is started, the reproduction unit 61 (for example, a reproducing head of the reproduction apparatus) reproduces the video signal, the audio signal, and the time information recorded on the magnetic tape, from "00:00:00:00", and the reproduction unit 61 outputs the reproduced video signal to the video output unit 14, the reproduced audio signal to the audio output unit 13, and the time information to the countdown audio generation unit 12. The user can see the played video with a monitor (not shown) connected to the video output unit 14, and hear the played music with speakers (not shown) connected to the audio output unit 13.

Assuming that 3 sec., 1 sec., and 0.1 sec. are set as periods T1, T2, and T3 shown in FIG. 2, respectively, the countdown audio generation unit 12 generates a beep of 0.1 sec. when the time information has become "00:00:32:00" and, thereafter, it generates a beep of 0.1 sec. each time the time information has become "00:00:33:00" and "00:00:34:00". The generated beeps are output to the audio output unit 13, and the user can hear the beeps from the speakers. After the three beeps have been output, the user can start singing from the predetermined singing start point "00:00:35:00".

As described above, the countdown audio generation apparatus according to this sixth embodiment is provided with the external audio input unit 62, and the audio output unit 13 outputs the audio signal in which the external audio signal, the reproduced audio signal, and the countdown audio signal are superposed. Therefore, in addition to the effects provided by the first embodiment, the user can hear the external audio supplied from the outside and the played audio together with the countdown audio. For example, when the countdown audio generation apparatus is used for karaoke, even a person who is not good at taking the timing to start singing can easily take the timing by hearing the countdown audio.

When the user is an expert of karaoke and does not need the countdown, the countdown audio generation unit 12 may be set so that it generates no countdown audio. In this way, both the expert and the beginner can enjoy karaoke.

While in this sixth embodiment the countdown audio generation apparatus outputs video as well as audio, the video output unit 14 is dispensable in the countdown audio generation apparatus.

Embodiment 7

Hereinafter, a countdown audio generation system according to a seventh embodiment of the present invention will be described with reference to the drawings.

Figure 11:
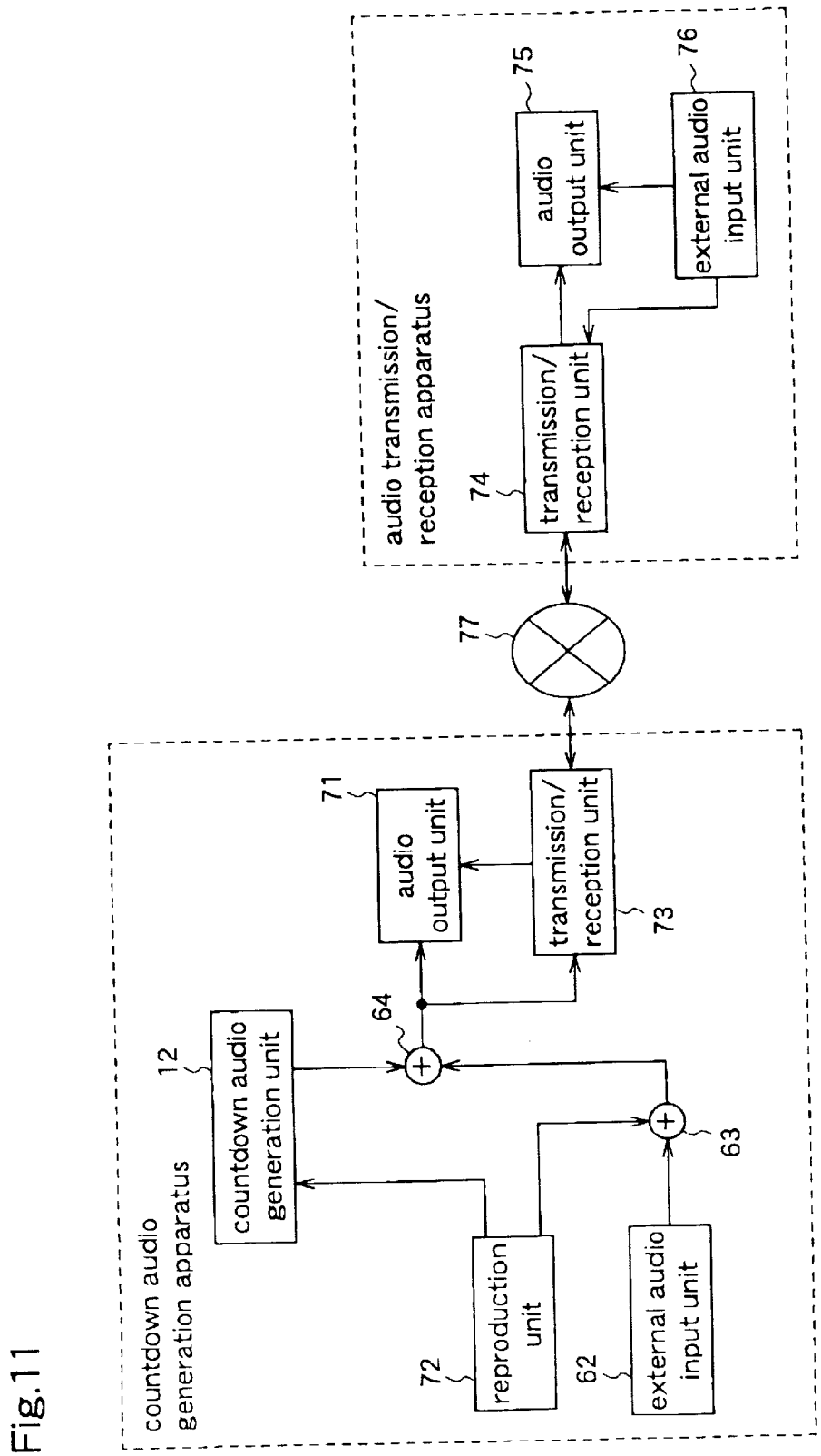
FIG. 11 is a block diagram illustrating a countdown audio generation system according to a seventh embodiment of the present invention.

FIG. 11 is a block diagram illustrating the structure of a countdown audio generation system according to a seventh embodiment of the present invention.

With reference to FIG. 11, the countdown audio generation system comprises a countdown audio generation apparatus and an audio transmission/reception apparatus which are connected to each other through a communication line 77. The countdown audio generation apparatus comprises a reproduction unit 72, a countdown audio generation unit 12, an audio output unit 71, an external audio input unit 62, a first audio superposing unit 63, a second audio superposing unit 64, and a transmission/reception unit 73. The audio transmission/reception apparatus comprises a transmission/reception unit 74, an audio output unit 75, and an external audio input unit 76. The constituents other than the audio output unit 71, the reproduction unit 72, the transmission/reception units 73 and 74, the audio output unit 75, and the external audio input unit 76 are identical to those of the countdown audio generation apparatus according to the sixth embodiment and, therefore, do not require repeated description.

The audio output unit 71 is an interface which receives a superposed audio signal from the second audio superposing unit 64 and an audio signal from the transmission/reception unit 73, and outputs these signals to headphones (not shown) or speakers (not shown).

The reproduction unit 72 is identical to the reproduction unit 61 of the sixth embodiment except that the unit 72 does not output a reproduced video signal.

The transmission/reception unit 73 receives the superposed audio signal from the second audio superposing unit 64, and transmits it through the communication line 77 to the transmission/reception unit 74. Further, the unit 73 receives the audio signal transmitted from the transmission/reception unit 74, and outputs it to the audio output unit 71. In this seventh embodiment, a public telephone line, a data communication line, or a communication network is employed as the communication line.

The transmission/reception unit 74 receives the audio signal transmitted from the transmission/reception unit 73, and outputs it to the audio output unit 75. Further, the unit 74 receives the audio signal input to the external audio input unit 76, and outputs it to the transmission/reception unit 73 through the communication line 77. The external audio input unit 76 is an interface which receives an audio signal from a microphone (not shown) or the like, and outputs the input external audio signal to the transmission/reception unit 74 and to the audio output unit 75. The audio output unit 75 superposes the audio signal from the transmission/reception unit 74 and the audio signal from the external audio input unit 76, and outputs the superposed signal.

Next, the operation of the countdown audio generation system will be described.

The countdown audio generation unit 12, the external audio input unit 62, and the first and second audio superposing units 63 and 64 operate in the same manner as already described for the sixth embodiment and, therefore, do not require repeated description. Further, the operation of the reproduction unit 72 is identical to that of the reproduction unit 61 of the sixth embodiment except that the unit 72 reproduces no video signal.

The superposed audio signal obtained in the second audio superposing unit 64 is output to the audio output unit 71 and to the transmission/reception unit 73. The audio output unit 71 outputs the input audio signal to speakers or the like. The transmission/reception unit 73 converts the input audio signal into an audio signal in a format that can be transmitted by the communication line 77, and transmits the audio signal through the communication line 77 to the transmission/reception unit 74.

The transmission/reception unit 74 receives the audio signal supplied from the transmission/reception unit 73, converts it into an audio signal in a format that can be output to the audio output unit 75, and outputs it to the audio output unit 75. The external audio input unit 76 receives an external audio signal from a microphone (not shown) or the like, and outputs it to the transmission/reception unit 74 and to the audio output unit 75. The audio output unit 75 superposes the audio signal from the transmission/reception unit 74 and the audio signal from the external audio input unit 76, and outputs the superposed audio signal to speakers (not shown) or the like.

The transmission/reception unit 74 converts the external audio signal supplied from the external audio input unit 76 into an audio signal in a format that can be transmitted by the communication line 77, and transmits it through the communication line 77 to the transmission/reception unit 73. The transmission/reception unit 73 receives the audio signal from the transmission/reception unit 74, converts it into a signal in a format that can be output to the audio output unit 71, and outputs it to the audio output unit 71. The audio output unit 71 superposes the audio signal supplied from the transmission/reception unit 73 and the audio signal supplied from the second audio superposing unit 64, and outputs the superposed signal to the speakers or the like. In this way, the user, who is hearing the output audio from the audio output unit 71 of the countdown audio generation system, can hear the reproduced audio, the countdown audio, and the external audio which is input to the external audio input units 62 and 76, through the speakers or the like. Further, the user, who is hearing the output audio from the audio output unit 75 of the countdown audio generation system, can hear the played audio, the countdown audio, and the external audio which is input to the external audio input units 62 and 76, through the speakers or the like.

Next, the operation of the countdown audio generation system will be described in detail by using an example.

In this example, the countdown audio generation system is applied to on-line karaoke. In the on-line karaoke, two users in distant places sing songs while listening to the song of the other user through a communication line. The timing to generate a countdown audio signal is identical to that already described for the sixth embodiment and, therefore, does not require repeated description.

The karaoke music played by the countdown audio generation apparatus, the countdown audio for indicating the singing start point which is generated by the countdown audio generation unit 12, and the singing voice of the user of the countdown audio generation apparatus, are transmitted to the audio transmission/reception apparatus through the transmission/reception unit 73 and the communication line 77, and the user of the audio transmission/reception apparatus can hear the karaoke music, countdown, and singing voice through the audio output unit 75 and the speakers or the like.

Further, the singing voice of the user of the audio transmission/reception apparatus, which has been input to the external audio input unit 76, is transmitted to the countdown audio generation apparatus by the transmission/reception unit 74. Then, the user of the countdown audio generation apparatus can hear the singing voice of the user of the audio generation apparatus, together with the played audio.

As described above, the countdown audio generation system according to the seventh embodiment is provided with the transmission/reception units 73 and 74, and the audio signal obtained by superposing the countdown audio signal, the reproduced audio signal, and the external audio signal is exchanged between these units 73 and 74 through the communication line 77. Therefore, in addition to the effects of the sixth embodiment, plural users in distant places can hear the countdown audio at the same timing and, further, each of the users can hear the external audio which has been input to the other user's end. For example, when the countdown audio generation system is applied to on-line karaoke, plural users in distant places can song a duet while hearing the partner's singing voice. Further, since the singing start point is indicated by the countdown audio generated by the countdown audio generation unit 12, the user of the countdown audio generation unit and the user of the audio transmission/reception apparatus can easily know the singing start point.

While in this seventh embodiment one countdown audio generation apparatus corresponds to one audio transmission/reception apparatus, this is only one example, and one countdown audio generation apparatus may correspond to a plurality of audio transmission/reception apparatuses. In this case, the countdown audio generation system can be used for a practice of concert or chorus among plural users in distant places.

Further, in the sixth and seventh embodiments, when the countdown audio generation apparatus is applied to karaoke, the time interval T2 of the countdown audio (refer to FIG. 2) is made equal to the rhythm of the karaoke music and, further, the period T1 in which the countdown audio signal is generated is made equal to one measure or plural measures of the karaoke music, whereby confirmation of the singing start point in karaoke is facilitated. In this case, the period (T2) corresponding to the rhythm of the music or the period (T1) in which the countdown audio signal is generated may be stored in the count down audio generation unit 12 in advance. Alternatively, these periods T2 and T1 may be recorded on the storage medium, and the reproduction unit 61 may read T2 and T1 and output them to the countdown audio generation unit 12. As audio data containing T1 and T2, for example, there is audio data which is written by MIDI (Musical Instrument Digital Interface) and stored electronically. In the MIDI, audio data is managed by dividing it into plural groups of note data that can be read by a computer and, therefore, the interval of rhythm, the by-one-measure previous position, or the number of times the countdown audio is output is easily decided when the singing start point is specified.

While in the third, fourth, sixth, and seventh embodiments the audio superposing unit 32, the first audio superposing units 43 and 63, and the second audio superposing units 44 and 64 superpose the audio signals at a predetermined gain, this is only one example, and the gain at which the audio signals are superposed may vary with time.

Further, in the first to seventh embodiments, the video output unit 14 or 72 may be provided with a countdown video generation unit which outputs a countdown video signal. The countdown video is a video displayed on an external monitor to let the user know the countdown end time, and characters "5", "4", "3", "2", "1" are used for example. This countdown video is superimposed on the played video to be output to the video output unit.

In the first to seventh embodiments, the countdown end time is previously set in the countdown audio generation unit 12, and the countdown audio generation unit 12 generates the countdown audio with reference to the time information from when the time information has reached a time a predetermined period before the countdown end time. However, this is only one example. Instead of setting the countdown end time in the countdown audio generation unit 12, a mark may be inserted in the countdown end point (e.g., narration start point) of the audio visual signal recorded on the storage medium. In this case, when the reproduction unit detects this mark during reproduction of the AV signal, the reproduction unit performs pre-roll for a predetermined period and then resumes reproduction. Then, the reproduction unit instructs the countdown audio generation unit to generate the countdown audio so that the time at which the mark is inserted becomes the countdown end time.

Further, in the first to seventh embodiments, when beeps of a single frequency are used as the countdown audio, the countdown audio generation unit 12 can be constituted at low cost.

Further, the countdown audio generation apparatus is usually provided with a generator for generating a reference signal having a frequency of 1 KHz for adjusting the audio output level, and this 1 KHz reference signal may be used as beeps.

Further, as the time interval T2 shown in FIG. 2, a period which is equal to an integer multiple of a frame time that is given by the inverse of the frame frequency of the reproduced video signal, may be used. When the reproduced video signal is an NTSC signal, the time interval T2 can be set at about 1 sec. by setting the T2 at a period equivalent to 30 frames. When the reproduced video signal is a PAL signal, the time interval T2 can be set at about 1 sec. by setting the T2 at a period equivalent to 25 frames.

Further, while in the first to seventh embodiments beeps are intermittently output as countdown audio, this is only one example. As the countdown audio, beeps may be output three times at time B3 (refer to FIG. 2), two times at time B2, and one time at time B1. Alternatively, intermittent audio like "Three", "Two", "One", "Go" or continuous audio like "Are you ready? Go. ", which are made to imitate human voice, may be used. Any audio may be used so long as it can indicate the countdown end time.

Further, while in the first to seventh embodiments the countdown audio generation unit 12 generates the countdown audio from when the time information has reached a time a predetermined period before the countdown end time to when the time information reaches the count down end time, this is only one example. The countdown audio generation unit 12 may generate the countdown audio by which the user can know the countdown end time, such as "5""4", "3", "2", "1", before the countdown end time and, after the countdown end time, the generation unit 12 may generate beeps at regular intervals. In this case, when the countdown audio generation apparatus is used for recording of narration, the narrator can use the beeps (countdown audio) to control the narration reading speed.

Further, while in the first to seventh embodiments the countdown audio generation unit 12 generates the countdown audio a predetermined period before the countdown end time, the generation unit 12 may start generating the countdown audio when operation of the countdown audio generation apparatus is started.

What is claimed is:

1. A countdown audio generation apparatus comprising:
    a reproduction unit for reproducing a video signal and time information between which predetermined synchronization is maintained;
    a video output unit for outputting the video signal reproduced by the reproduction unit;
    a countdown audio generation unit for generating a countdown audio signal which informs that the time information reproduced by the reproduction unit reaches a predetermined countdown end time; and
    an audio output unit for outputting the countdown audio signal generated by the countdown audio generation unit.

2. The countdown audio generation apparatus of claim 1 wherein the countdown audio generation unit generates the countdown audio signal from when the time information has reached a time a predetermined period before the countdown end time.

3. The countdown audio generation apparatus of claim 1 wherein the countdown audio generation unit generates the countdown audio signal until the countdown end time.

4. The countdown audio generation apparatus of claim 1 further comprising:
    a text video generation unit for generating a text video signal indicating the contents equivalent to the contents described on a predetermined manuscript;
    a video synthesis unit for synthesizing the text video signal and the reproduced video signal; and
    said video output unit outputting a synthetic video signal obtained by the video synthesis unit.

5. The countdown audio generation apparatus of claim 1 wherein said reproduction unit reproduces an audio signal as well, and said audio output unit further outputs the audio signal reproduced by the reproduction unit.

6. The countdown audio generation apparatus of claim 5 further comprising:
    an audio superposing unit for superposing the reproduced audio signal and the countdown audio signal; and
    said audio output unit outputting the reproduced audio signal and the countdown audio signal which have been superposed by the audio superposing unit.

7. The countdown audio generation unit of claim 1 further comprising:
    an external audio input unit to which an audio signal is supplied from the outside;
    a recording unit for recording the external audio signal supplied to the external audio input unit; and
    said audio output unit outputting the external audio signal as well.

8. The countdown audio generation apparatus of claim 7 further comprising:
    an audio superposing unit for superposing the countdown audio signal and the external audio signal; and
    said audio output unit outputting the countdown audio signal and the external audio signal which have been superposed by the audio superposing unit.

9. The countdown audio generation apparatus of claim 7 wherein said recording unit records the video signal reproduced by the reproduction unit.

10. The countdown audio generation apparatus of claim 7 wherein said reproduction unit reproduces an audio signal as well, and said audio output unit further outputs the audio signal reproduced by the reproduction unit.

11. The countdown audio generation apparatus of claim 10 further comprising:
a first audio superposing unit for superposing the external audio signal and the reproduced audio signal;
a second audio superposing unit for superposing the superposed audio signal obtained by the first superposing unit and the countdown audio signal; and
said audio output unit outputting the countdown audio signal, the external audio signal, and the reproduced audio signal which have been superposed by the first and second superposing units.

12. The countdown audio generation apparatus of claim 10 wherein said recording unit records the reproduced audio signal as well.

13. The countdown audio generation apparatus of claim 12 further comprising:
a first audio superposing unit for superposing the external audio signal and the reproduced audio signal;
a second audio superposing unit for superposing the superposed audio signal obtained by the first audio superposing unit and the countdown audio signal;
said audio output unit outputting the countdown audio signal, the external audio signal, and the reproduced audio signal which have been superposed by the first and second audio superposing units; and
said recording unit recording the external audio signal and the reproduced audio signal which have beep superposed by the first audio superposing unit.

14. A countdown audio generation apparatus comprising:
a reproduction unit for reproducing an audio signal and time information between which predetermined synchronization is maintained;
a countdown audio generation unit for generating a countdown audio signal from when the reproduced time information has reached a time a predetermined period before a predetermined countdown end time to when the countdown end time comes;
an external audio input unit to which an audio signal is supplied from the outside; and
an audio output unit for outputting the countdown audio signal, the reproduced audio signal obtained by the reproduction unit, and the external audio signal inputted to the external audio input unit.

15. The countdown audio generation apparatus of claim 14 wherein said countdown audio generation unit generates the countdown audio signal on the basis of the rhythm of audio reproduced by the reproduction unit.

16. The countdown audio generation apparatus of claim 14 further comprising:
said reproduction unit reproducing a video signal as well; and
a video output unit for outputting the video signal reproduced by the reproduction unit.

17. The countdown audio generation apparatus of claim 14 further comprising:
a first audio superposing unit for superposing the external audio signal and the reproduced audio signal;
a second audio superposing unit for superposing the superposed audio signal obtained by the first audio superposing unit and the countdown audio signal; and
said audio output unit outputting the countdown audio signal, the external audio signal, and the reproduced audio signal which have been superposed by the first and second audio superposing units.

18. A countdown audio generation system comprising a countdown audio generation apparatus and an audio transmission/reception apparatus,
said countdown audio generation apparatus comprising:
a reproduction unit for reproducing an audio signal and time information between which predetermined synchronization is maintained;
a countdown audio generation unit for generating a countdown audio signal from when the reproduced time information has reached a time a predetermined period before a predetermined countdown end time to when the countdown end time comes;
a first external audio input unit to which an audio signal is supplied from the outside;
a first transmission/reception unit for transmitting the countdown audio signal, the reproduced audio signal obtained by the reproduction unit, and the external audio signal inputted to the first external audio input unit, to the audio transmission/reception apparatus, and receiving an audio signal transmitted from the audio transmission/reception apparatus; and
a first audio output unit for outputting the countdown audio signal the reproduced audio signal, the external audio signal inputted to the first external audio input unit, and the audio signal received by the first, transmission/reception unit; and
said audio transmission/reception apparatus comprising:
a second external audio input unit to which an audio signal is supplied from the outside;
a second transmission/reception unit for receiving the audio signals transmitted from the countdown audio generation apparatus, and transmitting the external audio signal inputted to the second external audio input unit, to the countdown audio generation apparatus; and
a second audio output unit, for outputting the audio signals received by the second transmission/reception unit, and the external audio signal inputted to the second external audio input unit.

19. The countdown audio generation system of claim 18 wherein said countdown audio generation unit generates the countdown audio signal on the basis of the rhythm of audio reproduced by the reproduction unit.

20. The countdown audio generation system of claim 18 wherein a plurality of audio transmission/reception apparatuses correspond to one countdown audio generation apparatus.

* * * * *